April 1, 1941. C. C. JACKSON 2,236,686
SPRING SHACKLE
Filed March 31, 1939
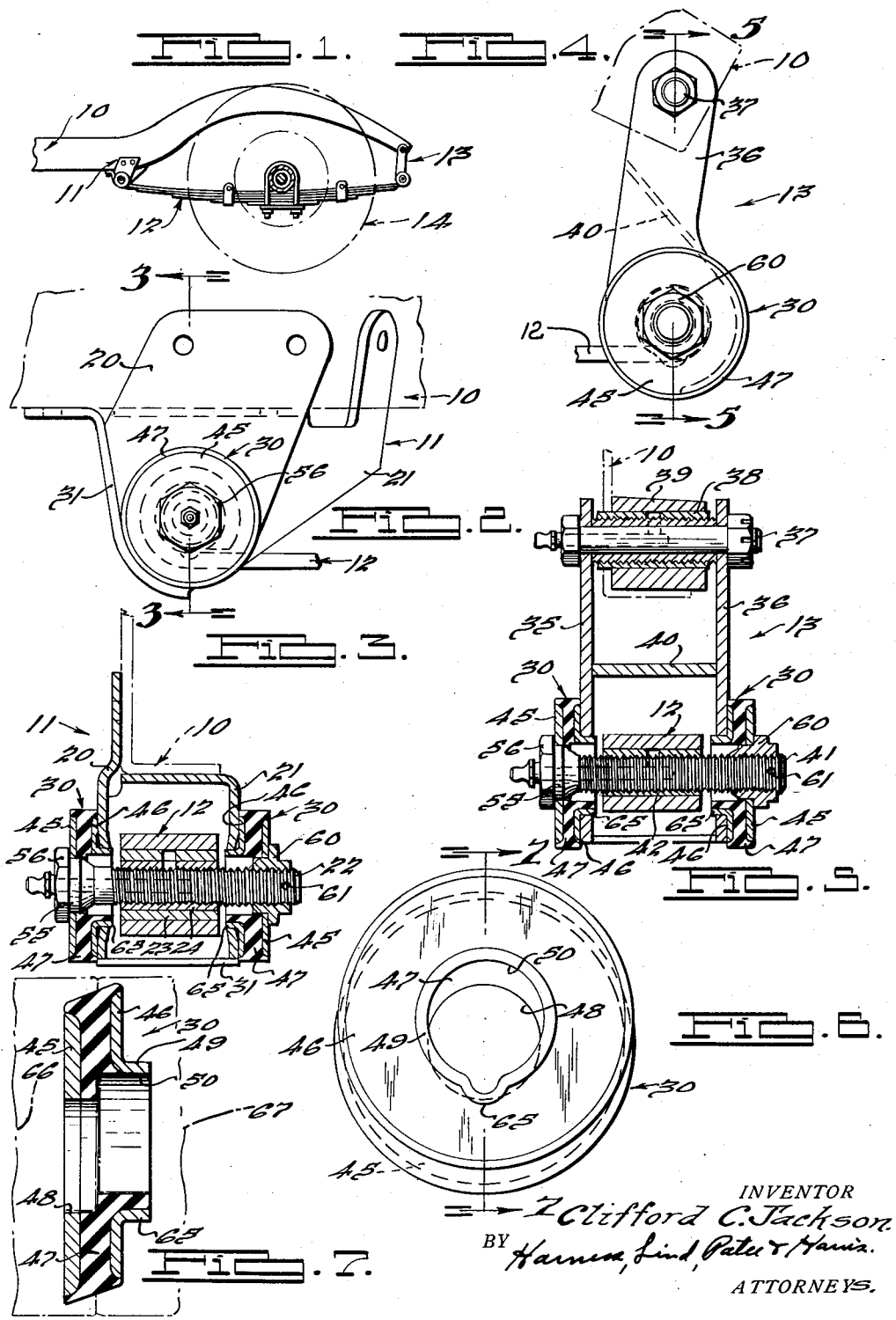
INVENTOR
Clifford C. Jackson
BY Harness, Lind, Pater & Harris
ATTORNEYS Patented Apr. 1, 1941

2,236,686

UNITED STATES PATENT OFFICE 2,236,686

SPRING SHACKLE

Clifford C. Jackson, Highland Park, Mich., assignor to Chrysler Corporation, Highland Park, Mich., a corporation of Delaware Application March 31, 1939, Serial No. 265,097

11 Claims. (Cl. 267—54)

The present invention relates to improved mounting members, with particular reference to spring shackles and shackle brackets employed in automotive vehicles and the like.

One of the principal objects of the present invention is to provide means whereby the transmission of vibrations from the sprung to the unsprung portions of an automotive vehicle, or vice versa, is prevented by yieldable, sound-insulating material. Another principal object of the invention is to provide a spring shackle and mounting bracket comprising rigid members bonded together by rubber connecting elements arranged therebetween so as to sustain the normal load thereon and to accommodate relative movement of the sprung and unsprung portions with respect to each other by shear stress of the rubber.

A further object of the present invention is to improve the structure set forth and claimed in the co-pending application of Glenn H. Parker, Serial No. 192,973, filed February 28, 1938, now Patent No. 2,166,822, issued July 18, 1939, the present invention being in one sense an improvement of the invention disclosed in the aforesaid application. The improvement consists essentially in the arrangement and construction of parts whereby a more easily convenable structure is obtained and whereby manufacture of the structure is extremely simplified.

Still further objects of the invention are to provide in vehicle spring shackles and spring mounting brackets a structure comprising relatively movable parts resiliently bonded together so as to hold the sprung and unsprung portions of the vehicle against relative lateral movements while accommodating relative vertical movements and which will dampen sound vibrations of the order resulting from movement of the vehicle over slight pavement irregularities and substantially prevent transmission of such sound vibrations without interfering with the normal action of the vehicle springs.

Other objects and advantages of the present invention will be more apparent from the following specification and drawing wherein like numerals refer to like parts throughout.

In the drawing Fig. 1 discloses a portion of a chassis of an automotive vehicle, an associated wheel and axle, and a connecting spring attached to the present mounting members; Fig. 2 discloses the spring mounting bracket of Fig. 1 in greater detail; Fig. 3 is a section taken along line 3—3 of Fig. 2 and looking in the direction of the arrows; Fig. 4 is an enlarged view of the spring shackle shown in Fig. 1; Fig. 5 is a vertical section taken substantially along line 5—5 of Fig. 4 and looking in the direction of the arrows; Fig. 6 is an enlarged elevation of a mounting thimble forming a part of the present invention; and Fig. 7 is a vertical section taken along line 7—7 of Fig. 6, Fig. 7 at the same time illustrating a step in the process of manufacturing the thimble.

Referring to Fig. 1, the sprung portion of an automotive vehicle is represented by a portion of the frame designated by the numeral 10. A spring shackle bracket 11 is mounted on an intermediate portion of the frame 10 and supports one end of a leaf spring assembly 12, the other end of which is attached to spring shackle links 13 pivotally connected to the frame 10, and the central portion of which is attached to the wheel and axle assembly generally designated by the numeral 14.

In Figs. 2 and 3 the spring shackle bracket assembly 11 is shown as comprising a vertically depending plate 20 suitably attached to a portion of the frame 10, and a spaced, parallel plate 21 also suitably attached to a portion or portions of the frame 10. An end of the spring assembly 12 is held between the plates 20 and 21 by a shackle pivot bolt 22 and its associated bushings 23 and 24. The weight of the chassis is transmitted to the wheel and axle through the vertical plates 20 and 21, each of which engages a portion of a thimble 30 having another portion engaging the shackle bolt 22 which transmits the load to the spring 12 and the axle. The plates 20 and 21 are preferably welded to a brace 31 which is suitably attached to the frame 10 and which forms a guard to prevent dirt and foreign objects from getting into the shackle bushings. The weight of the chassis is transmitted to the wheel and axle through the vertical plates 20 and 21, each of which engages a rigid portion of a thimble 30 having another rigid portion engaging the shackle bolt 22.

In Figs. 4 and 5 the spring shackle link assembly 13 is shown as comprising parallel, vertical links 35 and 36 depending from a pivot bolt 37 suitably mounted in a bushing 38 carried by a bearing member 39 mounted on the frame 10. The links 35 and 36 are welded to a brace 40 which partially extends about the shackle pivot bolt 41 to form a mud-guard therefor. The shackle pivot bolt 41 extends through a suitable bushing 42 about which the end of the main leaf of the spring assembly 12 is wrapped. The weight of the chassis is transmitted to the wheel and axle through the vertical links 35 and 36, each of which engages a rigid portion of a thimble 30 having another rigid portion engaging the shackle bolt 41 which transmits the load to the spring 12 and the axle, as previously described with respect to the shackle bracket 11.

Each thimble 30 comprises an outer plate 45, a parallel inner plate 46 and a thin layer 47 of resilient, sound-absorbing material bonded to the adjacent surfaces of the plates 45 and 46. The material is preferably rubber, which may be vulcanized to the metal plates, and the layer of material is preferably thick enough to prevent the transmission of vibrations from one plate to the other and yet thin enough to prevent undue sideward movement or tilting of one plate with respect to the other. The outer plate 45 is preferably in the form of a plane disc having a concentric, central opening 48 of sufficient diameter to receive an enlarged portion of bolt 41, or 22, as the case may be. The inner plate 46 is preferably disc-shaped and equal in area to the area of disc 45 and is provided with a protruding flange 49 defining an opening 50 of substantially the same, or perhaps slightly larger, diameter as the diameter of the opening 48. The bolt 22, or 41, is preferably so formed as to have a large shoulder 55 thereon adjacent the head 56, and then rapidly reduces in diameter before passing through the opening 50 in order that considerable vertical movement of plate 46 with respect to plate 45 may be accommodated during movement of the vehicle, and in order that the shackle may be assembled conveniently. When thimble 30 is in unstressed condition the plate 46 is eccentric with respect to plate 45, being held in such position by the unstressed rubber layer 47 which is moulded in the shape of an oblique cylinder, as seen in Figs. 6 and 7, and which has a portion of each end extending over the outer periphery of each disc, thereby increasing the bond and lessening the possibility of shear rupture. When in assembled position the vertical plates 20 and 21, or the links 35 and 36, which are provided with openings of sufficient diameter to embrace the flanges 49, thrust downwardly on the plates 46 against the upward force of the spring transmitted through bolts 22 and 41 and the plates 45, thereby distorting the rubber layers 47 so as to substantially align openings 48 and 50 and place the rubber layers under normal load shear stress.

The free ends of the bolts 22 and 41 pass through the associated thimbles 30 and have castellated nuts 60 threaded thereon and locked in position by cotter pins passing through openings 61. The nuts 60 are provided with portions of sufficient diameter to engage the openings 48 and rapidly reduced portions which terminate short of the inner plates 46 so as to permit vertical movement of the plates with respect to each other.

Each inner plate 46 is preferably provided with means to prevent rotation of the thimble when in position, such as the flange lug 65 which engages a complementary notch in the plate 20 or 21, or the link 35 or 36, thereby assuring assembly of the shackle in proper relation to place the rubber layers under shear stress to align the openings 48 and 50 under normal load.

The ease of manufacture of the thimbles 30 is indicated in Fig. 7 wherein portions of a mould are shown in skeleton outline. It can be seen that the plate 45 may be mounted on a die 66 having a reduced end fitting the opening 48 and extending substantially half of the thickness of the rubber layer 47 beyond the inner surface of the plate, and that plate 46 may be mounted upon a complementary moulding die 67 having a reduced end fitting the opening 50 and extending inwardly to meet the end of die 66. The remainder of the mould (not shown) is of such a contour as to create a rubber member which in unstressed condition has the vertical cross section seen in Fig. 7.

In assembling the brackets and shackles the wheels and axle and the attached springs are brought into position such that the internally threaded bushings are in line with the openings in the plates and links. A thimble 30 is slipped into place on each outer side of the bracket or shackle assembly and the bolts 22 and 41 threaded into firm engagement with the outer thimble, and then the nuts 60 are threaded upon the free ends of the bolts and locked in place. The reduced portions of the bolts permit assembly while the rubber layers are unstressed and the inner plates vertically positioned with respect to the outer plates. Upon releasing the temporary support of the chassis the weight thereof will stress the rubber layers into the normal loaded position seen in Figs. 3 and 5, wherein the openings 50 substantially concentrically surround the reduced portions of the bolts, thereby permitting substantial relative vertical movement of the two discs of the thimbles under road shocks.

Having described and illustrated a preferred embodiment of my invention, it should be apparent to those skilled in the art that the same permits of modification in arrangement and detail such as to be included within the scope of the following claims.

I claim:

1. A mounting thimble including a centrally apertured disc of rigid material, another centrally apertured disc of rigid material, and a layer of resilient material in the shape of an oblique cylinder having a substantially coaxially generated aperture therethrough and having its end surfaces bonded to said discs with the ends of its aperture substantially coinciding with the apertures of said discs, one of said discs having a protruding, annular flange surrounding its aperture whereby said thimble may be associated with a member to be mounted or its mounting means.

2. A mounting thimble including a centrally apertured disc of rigid material, another centrally apertured disc of rigid material, and a layer of resilient material in the shape of an oblique cylinder having a substantially coaxially generated aperture therethrough and having its end surfaces bonded to said discs with the ends of its aperture substantially coinciding with the apertures of said discs, one of said discs having a protruding, annular flange surrounding its aperture whereby said thimble may be associated with a member to be mounted or its mounting means, said flange having a lug thereon to prevent rotation of said thimble in use.

3. A mounting thimble comprising a centrally apertured disc of rigid material, another centrally apertured disc of rigid material, and a layer of resilient material in the shape of an oblique cylinder having a substantially coaxially generated aperture therethrough and having its end surfaces bonded to said discs with the ends of its aperture substantially coinciding with the apertures of said discs, said layer of resilient material having a thickened peripheral portion extending over and bonded to the peripheral edges of said discs, one of said discs having a protruding, annular flange surrounding its aperture whereby said thimble may be associated with a member to be mounted or its mounting means.

4. A mounting thimble comprising a centrally apertured disc of rigid material, another centrally apertured disc of rigid material, and a layer of resilient material in the shape of an oblique cylinder having a substantially coaxially generated aperture therethrough and having its end surfaces bonded to said discs with the ends of its aperture substantially coinciding with the apertures of said discs, said layer of resilient material having a thickened peripheral portion extending over and bonded to the peripheral edges of said discs, one of said discs having a protruding, annular flange surrounding its aperture whereby said thimble may be associated with a member to be mounted or its mounting means, said flange having a lug thereon to prevent rotation of said thimble in use.

5. In a chassis mounting, the combination of a pair of vertical plates attached to a portion of the chassis in spaced, depending relation and having aligned apertures therethrough, a spring assembly comprising a pivot bolt of materially lesser diameter than the diameter of said apertures and extending through said apertures, and a centrally apertured mounting thimble associated with each of said vertical plates and adapted to transmit the weight of said chassis to said spring assembly through said pivot bolt, each of said mounting thimbles comprising a first rigid member having means of attachment to one of said vertical plates, a layer of resilient material bonded to said first rigid member, and a second rigid member bonded to the opposite surface of said layer.

6. In a chassis mounting, the combination of a pair of vertical plates attached to a portion of the chassis in spaced, depending relation and having aligned apertures therethrough, a spring assembly comprising a pivot bolt of materially lesser diameter than the diameter of said apertures and extending through said apertures, and a centrally apertured mounting thimble associated with each of said vertical plates and adapted to transmit the weight of said chassis to said spring assembly through said pivot bolt, each of said mounting thimbles comprising a first rigid plate having an annular flange adapted to be embraced by the periphery of the aperture of one of said vertical plates, a second rigid plate adapted to engage a portion of said pivot bolt, and a layer of resilient material having its surfaces bonded to adjacent surfaces of said rigid plates.

7. In a chassis mounting, the combination of a pair of vertical plates attached to a portion of the chassis in spaced, depending relation and having aligned apertures therethrough, a spring assembly comprising a pivot bolt of materially lesser diameter than the diameter of said apertures and extending through said apertures, and a centrally apertured mounting thimble associated with each of said vertical plates and adapted to transmit the weight of said chassis to said spring assembly through said pivot bolt, each of said mounting thimbles comprising a first rigid plate having an annular flange adapted to be embraced by the periphery of the aperture of one of said vertical plates, a second rigid plate adapted to engage a portion of said pivot bolt, and a layer of resilient material having its surfaces bonded to adjacent surfaces of said rigid plates, said layer being in the form of an oblique cylinder in unstressed condition and substantially in the form of a right cylinder when placed in shear-stressed condition by the weight of said chassis.

8. In a chassis mounting, the combination of a pair of vertical plates attached to a portion of the chassis in spaced, depending relation and having aligned apertures therethrough, a spring assembly comprising a pivot bolt of materially lesser diameter than the diameter of said apertures and extending through said apertures, and a centrally apertured mounting thimble associated with each of said vertical plates and adapted to transmit the weight of said chassis to said spring assembly through said pivot bolt, each of said mounting thimbles comprising a first rigid plate having an annular flange adapted to be embraced by the periphery of the aperture of one of said vertical plates, a second rigid plate adapted to enage a portion of said pivot bolt, and a layer of resilient material having its surfaces bonded to adjacent surfaces of said rigid plates, said layer being in the form of an oblique cylinder in unstressed condition and substantially in the form of a right cylinder when placed in shear-stressed condition by the weight of said chassis, and said flange and said vertical plates being provided with complementary means to prevent rotation of the thimble when in use.

9. In a vehicle comprising sprung and unsprung portions having a spring suspension therebetween including a leaf spring, a mounting member yieldably connecting a part of said leaf spring to one of said vehicle portions comprising a metal section attached to one of said vehicle portions and having an aperture therein, a member extending through said aperture and connected to said leaf spring, a yieldable connecting unit between said metal section and said member including a pair of rigid plate-like elements having opposed surface portions disposed in planes substantially parallel to the plane of deflection of said spring, and a layer of rubber between said surfaces having opposite sides bonded thereto, one of said plate-like elements having a protruding part receivable in said aperture of said metal section and the other being secureable to said member, said rubber layer being so constructed and arranged as to sustain the part of the weight of said vehicle applied thereon in shear and to accommodate relative vertical movement of said spring and one of said vehicle portions by shear stress of said rubber.

10. A mounting thimble including a centrally apertured disc of rigid material, another centrally apertured disc of rigid material, and a layer of resilient material in the shape of an oblique cylinder having a substantially coaxially generated aperture therethrough and having its end surfaces bonded to said discs with the ends of its aperture substantially coinciding with the apertures of said discs, one of said discs having a protruding, annular flange surrounding its aperture whereby said thimble may be associated with a member to be mounted or its mounting means and means thereon to prevent relative rotation of said mounting thimble and member with respect to each other.

11. In a chassis mounting, the combination of a pair of vertical plates attached to a portion of the chassis in spaced, depending relation and having aligned apertures therethrough, a spring assembly comprising a pivot bolt of materially lesser diameter than the diameter of said apertures and extending through said apertures, and a centrally apertured mounting thimble associated with each of said vertical plates and adapted to transmit the weight of said chassis to said spring assembly through said pivot bolt, each of said mounting thimbles comprising a first rigid member having means of attachment to one of said vertical plates, a layer of resilient material bonded to said first rigid member, and a second rigid member bonded to the opposite surface of said layer, and each of said thimbles and vertical plates having complementary engaging surfaces for preventing rotation of said thimbles with respect to said plates.

CLIFFORD C. JACKSON.